United States Patent
Chanclou et al.

(10) Patent No.: US 7,155,096 B2
(45) Date of Patent: Dec. 26, 2006

(54) OPTICAL COLLIMATOR FOR MONOMODE FIBERS; MONOMODE FIBER WITH INTEGRATED COLLIMATOR AND METHOD FOR MAKING SAME

(75) Inventors: Philippe Chanclou, Brest (FR); Philippe Gravey, Brest (FR); Monique Thual, Lannion (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 10/399,506

(22) PCT Filed: Oct. 12, 2001

(86) PCT No.: PCT/FR01/03156

§ 371 (c)(1),
(2), (4) Date: Oct. 20, 2003

(87) PCT Pub. No.: WO02/33463

PCT Pub. Date: Apr. 25, 2002

(65) Prior Publication Data

US 2004/0047575 A1  Mar. 11, 2004

(51) Int. Cl.
G02B 6/14 (2006.01)
G02B 6/32 (2006.01)

(52) U.S. Cl. .................. 385/123; 385/28; 385/34; 385/50

(58) Field of Classification Search ............ 385/27, 385/28, 39, 43, 50, 123, 124
See application file for complete search history.

(56) References Cited

U.S. PATENT DOCUMENTS

| | | | | |
|---|---|---|---|---|
| 4,701,011 A | * | 10/1987 | Emkey et al. | 385/34 |
| 4,737,004 A | | 4/1988 | Amitay et al. | |
| 4,893,892 A | | 1/1990 | Ziemek et al. | |
| 5,337,380 A | * | 8/1994 | Darbon et al. | 385/28 |
| 5,729,643 A | | 3/1998 | Hmelar et al. | |
| 5,732,170 A | * | 3/1998 | Okude et al. | 385/27 |
| 5,940,554 A | | 8/1999 | Chang et al. | |
| 6,014,483 A | * | 1/2000 | Thual et al. | 385/33 |
| 6,049,643 A | * | 4/2000 | Lee et al. | 385/28 |
| 2002/0063952 A1 | * | 5/2002 | Nyman et al. | 359/342 |

FOREIGN PATENT DOCUMENTS

| | | |
|---|---|---|
| GB | 2169096 | 7/1986 |
| JP | 58158620 | 9/1983 |
| JP | 59177503 | 10/1984 |

* cited by examiner

Primary Examiner—Rodney Bovernick
Assistant Examiner—Omar Rojas
(74) Attorney, Agent, or Firm—Patterson, Thuente, Skaar & Christensen, P.A

(57) ABSTRACT

An optical collimator for single mode fibers includes a fiber segment (S1) with mode expansion including an entry and an exit for a light beam. The entry of the fiber segment with mode expansion is on the side at which the core diameter is the smallest, and the exit is on the side at which the core diameter is the largest. The collimator further includes a fiber segment (S2) with expansion holding coupled to the exit, the core diameter of which is equal to or greater than the largest core diameter of the fiber segment with mode expansion, so that the diameter of the light beam guided for this segment is kept constant.

9 Claims, 2 Drawing Sheets

Fibre with diffractive lens at end
(Prior Art)

OPTICAL COLLIMATOR FOR MONOMODE FIBERS; MONOMODE FIBER WITH INTEGRATED COLLIMATOR AND METHOD FOR MAKING SAME

BACKGROUND OF THE INVENTION

This invention relates to an optical collimator for single mode fibres. It relates to a single mode optical fibre with integrated collimator and a manufacturing process.

DESCRIPTION OF THE PRIOR ART

Optical collimators for single mode fibres are used to wider the size of the beam and thus release positioning constraints and the influence of dust on coupling of an optical fibre with an optical module at the end of the fibre (the optical module may be another fibre, an active component or a connector).

Remember that in the telecommunications field, the single mode fibre is the preferred support for high-speed transmissions over long distances. However, the use of this fibre for its propagation properties introduces major assembly difficulties whenever two fibres have to be connected together. The emission surface of single mode fibers is small, of the order of 10 µm diameter. Therefore, it can be understood that the size of this emission surface makes optical coupling very sensitive to axial and transverse positioning, and to the slightest dust or end defect.

Consequently, it is usual to place or make an optical collimator at the end of single mode fibres to eliminate these constraints.

Several technological solutions are now available to make this type of collimator.

A first solution shown in FIG. 1 consists of positioning (glue, weld, etc.) a rod with an index gradient at the end of the single mode fibre and with a diameter greater than the diameter of the single mode fibre. For example, the diameter of the rod is about 2 mm while the diameter of the fibre is 125 µm.

This collimator can give an exit beam of about 500 µm with a divergence of 0.25°.

This type of collimator enables assembly on connector type circuits and is perfectly suitable in the case of fibre/free space interfaces.

The qualities of this type of collimator are minimum losses, low divergence and low refraction of the signal due to skew assemblies and anti-reflection treatments.

Unfortunately, the disadvantage of this solution is its low degree of integration of the optical function with respect to the size and price of the fibre.

The 2 mm diameter of the rod with an index gradient is 16 times greater than the diameter of the fibre which is equal to 125 µm. Therefore, the compactness of opto-electronic modules is limited. Furthermore, this type of technology requires good mechanical alignment of the fibre with the rod with an index gradient, which makes the connectorised product expensive.

Another technology consists of using a wide mode fibre-based collimator as shown in FIGS. 2a, 2b and 2c.

Widening the light beam by modifying the core of the fibre is a means of integrating a collimation function in the fibre. Integration of the optical function is then complete ant the fibre. The following methods may be used to make wide mode fibres:

melting and drawing to deconfine the fibre mode, reducing the guide cross-section (proposed in 1978 by K. Furuya et al.), a gradual increase in the guiding section with the outside diameter (proposed in 1987 by N. Amitay et al.), diffusion of doping atoms in the core of the single mode fibre by a heat treatment (proposed by K. Shigihara et al. in 1986). This fibre corresponds to the TEC (Thermally diffused Expanded Core) fibre.

However, there are disadvantages with this solution:

In order to obtain a thin guide, the melting and drawing process is very sensitive to mechanical disturbances and modifications of the index of the single mode fibre. Furthermore, the outside diameter does not remain at 125 µm, which requires a special connector to support it.

Simultaneous widening of the outside diameter and the core requires special preforms. This is not very compatible with mass production at low cost. Furthermore, specific connectors are necessary. The integration level is low.

Mode expansion by diffusion of doping atoms has the disadvantage that it is sensitive to the cleavage area.

Another technology consists of using a collimator based on lens fibres as shown in FIG. 3. The specific feature of the micro-lens is the addition of material (by welding) at the end of the single mode fibre to control expansion of the beam. The first solution consists of welding et segment of the multimode fibre with an index gradient, at the end of the single mode fibre. An appropriate length of this fibre is used to obtain a section that acts as a collimation lens for the light beam. A greater range of mode diameters and working distances may be obtained by using different natures of fibres. There are many qualities of these micro-lenses (FIG. 3):

Good integration with fairly short lengths of the order of 500 µm, and outside diameters of 125 µm equivalent: to the value of the single mode fibre, Lower costs since the quantity and price of the raw material used are low, Sufficiently widened beams to give a good compromise between angular positioning and translation tolerances, and working distances, of the order of 1 millimeter, which is sufficient for interconnection applications, Known reproducibility and manufacturing quality, since the steps consist of elementary welding and cleavage steps.

An additional benefit is the possibility of collective manufacturing (in fibre ribbons) with appropriate cleavage and welding machines.

However, this solution also has disadvantages.

The optical properties are obtained by defined lengths of fibre with index gradient or other. The and of the fibre is not easily useable for polishing or cleavage at a skew which are elementary steps in connectorising a fibre. The risk is then that the end lens may be modified or even deleted.

Therefore, this fibre cannot benefit from the manipulation and connectorisation technology for standard fibres.

And finally, a fourth technology consists of a collimator based on a diffractive lens like that shown in FIG. 4.

This technology developed by Digital Optics Corporation consists of making a diffractive lens by photo-inscription at the end of a silica rod itself welded to an optical fibre. The pattern of the lens enables collimnation of the light beam.

Unfortunately, this solution has the following disadvantages:

The alignment of the photo-inscription mask and the ends of the fibres is complicated for a collective embodiment. It is possible to make fibre matrices but expensive alignments are necessary.

Obviously, this fibre with a diffractive lens cannot be polished or cleaved without destroying the lens. It is almost impossible to connectorise it.

SUMMARY OF THE INVENTION

The purpose of the invention is to solve these problems. The purpose of the invention is a collimator that can be completely integrated into manufacturing of single mode optical fibres. The result is an optical fibre with a large mode diameter which is completely integrated into the dimension of the fibre and which is easily handled for assembly purposes.

The purpose of the invention is an optical collimator for single mode fibres, characterised mainly in that it comprises a fibre segment with mode expansion and a fibre segment with expansion holding.

According to another characteristic, the fibre segments call have the same diameter.

According to one embodiment, the fibre segment with expansion holding is composed of a step index multimode fibre.

According to another embodiment, the fibre segment with expansion holding is composed of a single mode fibre with a core diameter greater than the core diameter of the single mode fibre for which it is designed.

According to one variant embodiment, the fibre segment with expansion holding is composed of a doped core fibre.

According to another variant embodiment, the fibre segment with mode expansion consists of several different natures of fibres.

Another purpose of the invention relates to an optical single mode fibre with wide field, characterised mainly in that it comprises a section at the end keeping the diameter of the light beam transmitted by the fibre constant.

The section keeping the diameter of the light beam constant may consist of a step index fibre segment.

The section keeping the diameter of the light beam constant may be composed of a large core fibre segment.

The fibre comprises a section with mode widening.

According to another characteristic, the fibre and the fibre segments at its ends have the same diameter.

The invention also relates to a process for making a set of optical fibres with mode expansion characterised mainly in that it comprises the following steps:

collectively weld a set of n fibres with expansion holding mode to a set of n single mode fibres with mode expansion collectively fracture the set of n fibres with expansion holding so as to obtain n segments with predetermined lengths.

The sets of n fibres are in the form of fibre ribbons.

Expansion holding fibres used in the manufacturing process are step index single mode fibres.

According to another embodiment, the expansion holding fibres are single mode fibres wide large core.

Other special features and advantages of the invention will become clear after reading the description given below for illustrative and non-limitative purposes with reference to the attached drawings on which:

DESCRIPTION OF THE PREFERRED EMBODIMENT

Figure 1:
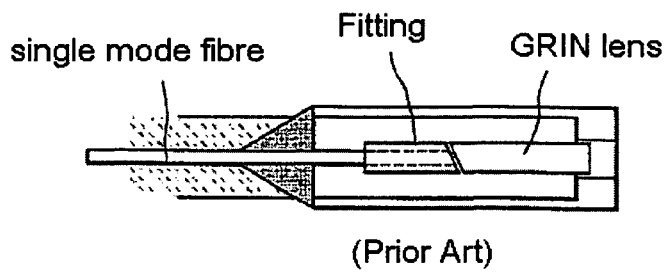
FIGS. 1, 2a, 2b, 2c, 3 and 4 show collimator arrangements according to the state of the art.
Figure 2A:
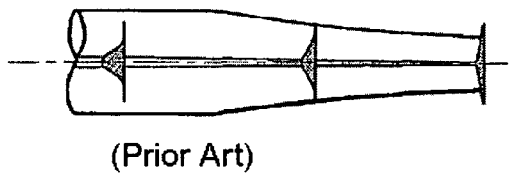
Figure 2B:
Figure 2C:
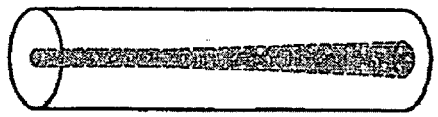
Figure 3:
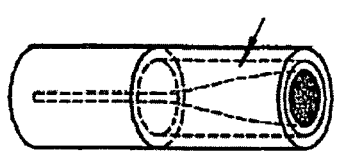
Figure 4:
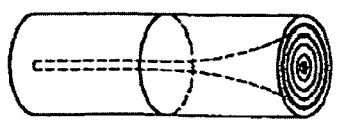
Figure 5:
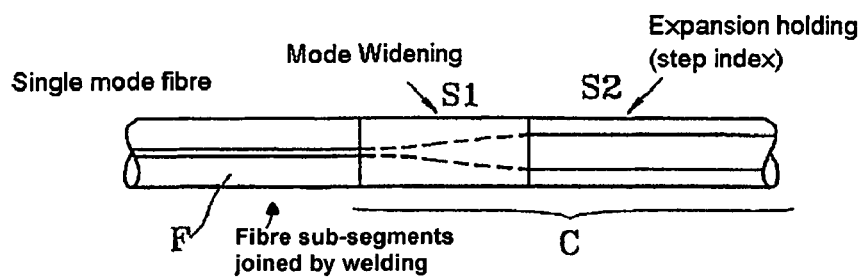
FIG. 5 shows a diagram of an optical fibre with an integrated collimator according to the invention.

According to the invention, the collimator C illustrated by the diagram in FIG. 5 comprises a mode widening lens S1. This mode expansion lens S1 may be used by segments with different natures of fibres, put together to each other by welding, or by a doped fibre segment, doping being done in a manner known in itself by diffusion of doping atoms in the core of the fibre.

The collimator C according to the invention also comprises a lens S2 with expansion holding (hold wide mode), in other words a lens capable of propagating a constant diameter light beam. This expansion lens S2 is made by a fibre segment with the required properties. It may be a step index fibre segment or a single mode fibre segment with large core, in other words with a core diameter greater than the core diameter of the expansion fibre segment.

It is found that such a collimator can be perfectly integrated into the production of a single mode fibre as illustrated in FIG. 5.

The single mode fibre F comprises a collimator C at its end that does not make any change to the outside appearance of the fibre F in any way since its outside diameter is the same as the outside diameter of the fibre, and it does not make any change to its mechanical strength.

Furthermore, this collimator C enables assembly on connector type circuits and is perfectly suitable for the case of fibre/free space interfaces.

The collimator made in this way does not impose any constraint on the length of the fibre segment with expansion holding S2, such that complete freedom is left about the choice of this length.

If necessary, it is also possible for the end facet of this segment to be either:

polished or cleaved straight or skew, rounded, or etched, or it may be provided with an anti-reflection deposit or a deposit of any pattern whatsoever (for example photo-inscription) to make a diffraction lens.

The end of this section S2 may also be drawn, thinned if necessary without destruction or modification of the function provided by this section.

Furthermore, the collimator C enables a connection with any lens, including with any other fibre welded to its end.

A light beam injected into the fibre F is collimated in the section S1 and is then guided by the section S2. The propagation mode in this section corresponds to mode LP01. It practice, "large" mode LP01 can be propagated over a certain distance. Propagation of this mode is not accompanied by any variation in the geometry of the optical beam (mode diameter). Excitation of this mode, and this rode only, depends on the injection quality of the beam originating from section S1 to section S2.

Production of a single mode fibre comprising a collimator with mode expansion holding according to the invention is compatible with collective manufacturing, in other words with the simultaneous manufacturing of several fibres. Collective manufacturing is particularly applicable to sets of fibres such as fibre ribbons.

Figure 7:
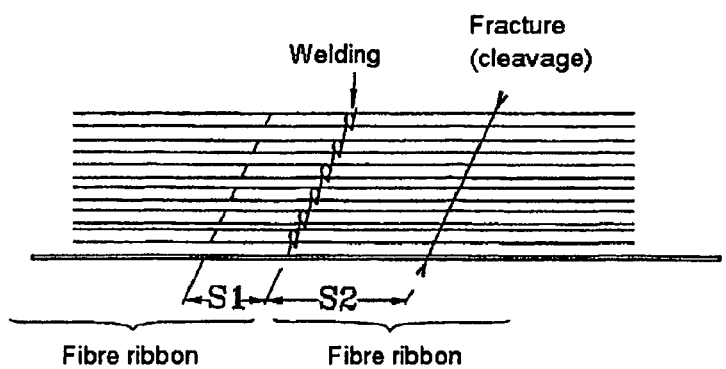
FIG. 7 shows collective manufacturing of single mode fibres according to the invention.

FIG. 7 illustrates collective manufacturing of optical fibres with mod expansion according to the invention.

The manufacturing process consists firstly of making a set of single mode fibres with mode expansion.

The process also consists of collectively making a set of fibres with expansion holding (step index fibres or large core fibres).

Finally, the process consists of collectively welding the mode expansion and mode holding fibres end to end and then collectively cleaving the fibres with mode holding to the required length.

The applicant made a fibre with integrated collimator according to the invention for different fibre lengths with index step at the end. The results of the different tests were independent of the length of this end fibre, for lengths varying from 0 to 10 μm. In the example chosen, the mode diameter is 20 μm. This mode diameter is obtained by using sections of different natures of fibres. The injected wave is assumed to be plane at the entry to the index step fibre.

The characteristics of the fibre are as follows:
single mode fibre: G652, $\phi_{EXT}$=125 μm, $\phi_{core}$=7.2 μm
mode expansion lens (section S1): change from 11 μm to 20 μm
index step fibre (S2): $\phi_{EXT}$=125 μm, $\phi_{core}$=35 μm (step index) $\Delta n=21\times 10^{-3}$ For this fibre, the diameter in mode LP01 is 20 μm.

This is an example, and the characteristics of fibres may be different. For example, the diameter of mode LP01 with a standard fibre with index step 50/125 is about 30 μm.

Figure 6:
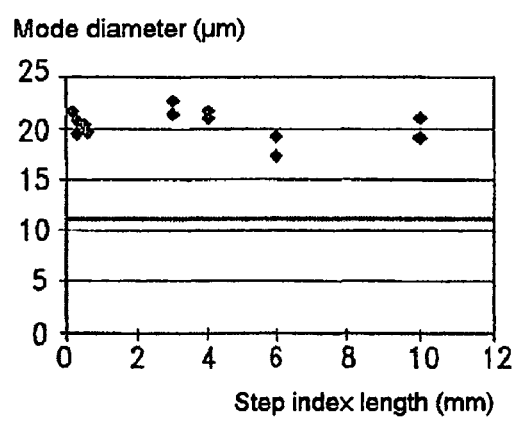
FIG. 6 shows a mode diameter variation table as a function of the length of the step index multimode fibre.

FIG. 6 demonstrates that the length of the single mode fibre with step index is independent of the exit beam mode diameter.

Note that the beam mode diameter is unchanged for a fibre length with step index between 0 and 10 mm.

Furthermore, tests were carried out on the interconnection efficiency. The interconnection efficiency is the same as for a fibre without a segment of a multimode fibre with step index. Therefore, this fibre does not in any way change the optical properties of the interconnection. The positioning tolerance is the same as the positioning tolerance of two 20 μm mode diameter beams.

These losses include Fresnel losses of the silica/air dioptre, equal to 0.34 db.

Thus, the applicant has made and modelled an integrated collimator to the fibre dimension for which, to a certain extent, the optical properties are independent of the length of its end.

The invention claimed is:

1. An optical collimator for single mode fibres comprising:
  a first fibre segment with mode expansion comprising an entry and an exit for a light beam and configured for widening a diameter of the light beam and for collimating the light beam; and
  a second fibre segment with expansion holding coupled to the exit of the first fibre segment and adapted to keep a diameter of the light beam for the second segment constant,
  wherein the first fibre segment and the second fibre segment are configured such that the light beam originating from the first fibre segment and injected into the second fibre segment is adapted to excite only an LP01 mode of the second fibre; and
  wherein the first fibre segment and the second fibre segment have substantially equal outside diameters and wherein the first fibre segment with mode expansion comprises a plurality of different fibre sub-segments joined by welding.

2. An optical collimator according to claim 1, wherein the second fibre segment with expansion holding comprises a single mode fibre with step index.

3. An optical collimator according to claim 1, wherein the second fibre segment with expansion holding comprises a single mode fibre with a first core diameter greater than a second core diameter of a single mode fibre for which the second fibre segment is designed.

4. An optical collimator according to claim 1, wherein the first fibre segment with mode expansion comprises a doped core fibre segment.

5. An optical collimator according to claim 1, wherein the first fibre segment with mode expansion consists of fibres of several different natures.

6. An optical collimator according to claim 1, wherein the second fibre segment with expansion holding has a length of at least about 10 millimeters.

7. An optical collimator according to claim 1, wherein the first fibre segment with mode expansion and the second fibre segment with expansion holding are coupled by welding.

8. An optical single mode fibre having an integrated collimator, comprising:
  an optical collimator, the optical collimator comprising
    a first fibre segment with mode expansion comprising an entry and an exit for a light beam and configured for widening a diameter of the light beam and for collimating the light beam; and
    a second fibre segment with expansion holding coupled to the exit of the first fibre segment and adapted to keep a diameter of the light beam for the second segment constant;
    wherein the first fibre segment and the second fibre segment are configured such that the light beam originating from the first fibre segment and injected into the second fibre segment is adapted to excite only an LP01 mode of the second fibre segment;
  wherein the optical collimator is arranged at one end of the optical single mode fibre; and
  wherein the first fibre segment and the second fibre segment have substantially equal outside diameters and wherein the first fibre segment with mode expansion comprises a plurality of different fibre sub-segments joined by welding.

9. An optical single mode fibre according to claim 8, wherein the collimator has an external diameter substantially equal to an external diameter of the optical single mode fibre.

* * * * *